United States Patent [19]

Perkins

[11] 4,111,184

[45] Sep. 5, 1978

[54] SUN TRACKING SOLAR ENERGY COLLECTOR

[76] Inventors: James C. Fletcher, Administrator of the National Aeronautics and Space Administration, with respect to an invention of, Gerald S. Perkins, Altadena, Calif.

[21] Appl. No.: 785,257

[22] Filed: Apr. 6, 1977

[51] Int. Cl.² .............................................. F24J 3/02
[52] U.S. Cl. ..................................... 126/270; 126/271
[58] Field of Search ............... 126/270, 271; 237/1 A; 60/641

[56] References Cited

U.S. PATENT DOCUMENTS

| 528,255 | 10/1894 | Monks et al. | 126/270 |
| 670,917 | 3/1901 | Eneas | 126/271 |
| 4,010,614 | 3/1977 | Arthur | 126/270 |
| 4,030,890 | 6/1977 | Diggs | 126/271 |
| 4,038,972 | 8/1977 | Orrison | 126/270 |

*Primary Examiner*—Kenneth W. Sprague

*Attorney, Agent, or Firm*—Wilfred Grifka; John R. Manning; Monte F. Mott

[57] ABSTRACT

A parabolic reflector is supported so that it can track the sun. The support for this reflector comprises an azimuth frame supported on two wheels and a central pivotal point which are positioned in a substantially triangular configuration. The two wheels rotate on tracks. On top of the azimuth frame, there is provided an elevation frame. The elevation frame includes curved rails which define a portion of an arc and extend vertically. The reflector rides on wheels captured within the curved rails. The wheels of the azimuth frame are driven by an azimuth actuator. The reflector structure is counterbalanced about its elevation axis by a pendulum cable system which is driven by a motor to change elevation. At the focal point of the parabolic reflector, a heat engine or receiver is mounted independently on the reflector. Suitable means are provided for moving the reflector about its two axes in order to track the sun.

8 Claims, 4 Drawing Figures

SUN TRACKING SOLAR ENERGY COLLECTOR

ORIGIN OF THE INVENTION

The invention described herein was made in the performance of work under a NASA contract and is subject to the provisions of Section 305 of the NASA Act of 1958, Public Law 85-568 (72 Stat. 435; 42 USC 2457).

BACKGROUND OF THE INVENTION

This invention relates to systems for collecting solar energy and more particularly to improvements therein.

A comparison of solar energy collected by typical non-tracking systems, single-axis systems, and two axis systems is able to harvest 78-80% of the available direct normal radiation, whereas the single axis system collects 30-35% and the non-tracking system collects between 17 and 20%. Of further interest is that the non-tracking systems provide a collection temperature of between 300°-400° F., single axis trackers between 500°-600° F., but temperatures in the range of between 1000°-2000° F. may be easily attained by two axis tracking systems. Thus, from the foregoing, it can be seen that a two axis solar energy collection system is clearly superior. However, the superior performance of the two axis system, unfortunately, is not a determinant as to which system is selected. Such items as initial cost and operating costs, etc. are also taken into consideration. Accordingly, the key to taking advantage of a much higher potential performance of a two axis system is to achieve an initial cost, as well as operating expense levels, which will be less in proportion to the output derived than those from the other systems. Stated in another way, the system which should be selected should be the one that has the lowest cost per kilowatt of electricity derived.

OBJECTS AND SUMMARY OF THE INVENTION

As object of this invention is to provide a solar tracking and energy collecting system which has a substantially low manufacturing and maintenance cost.

Another object of this invention is to provide an improved two axis sun tracking solar energy collection system which has a lower cost per kilowatt of output energy than presently known systems.

The foregoing and other objects of the invention may be achieved in an arrangement whereby a parabolic reflector, which collects the energy, is supported on an elevation frame which in turn is supported upon an azimuth frame. The azimuth frame has a triangular support system wherein it pivots about one point of the triangle and has wheels at the other two points of the triangle which ride on a peripheral circular track. The elevation structure is supported on the azimuth structure and has two curved rails describing a vertical arc and extending sufficiently so that the parabolic reflector which rides on wheels captured in the rails can be moved from a horizontal to substantially a vertical position. Suitable propulsion means are provided for the azimuth frame so that it can describe a 360° rotation. The means for moving the parabolic reflector include a counter balance to reduce the amount of energy required to move the reflector from one end to the other of its curved rails. Suitable and well known sun tracking circuits are provided to generate the signals required to drive the azimuthal and elevation motors to maintain the parabolic reflector facing the sun.

A heat engine or solar flux receiver is mounted separately on a small tower so as to be positioned at the focal point of the parabolic reflector. The heat engine may be mounted in a gimbal and tethered to the parabola structure by a system of cables in order to keep the receiver pointed along the axis of the parabola.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
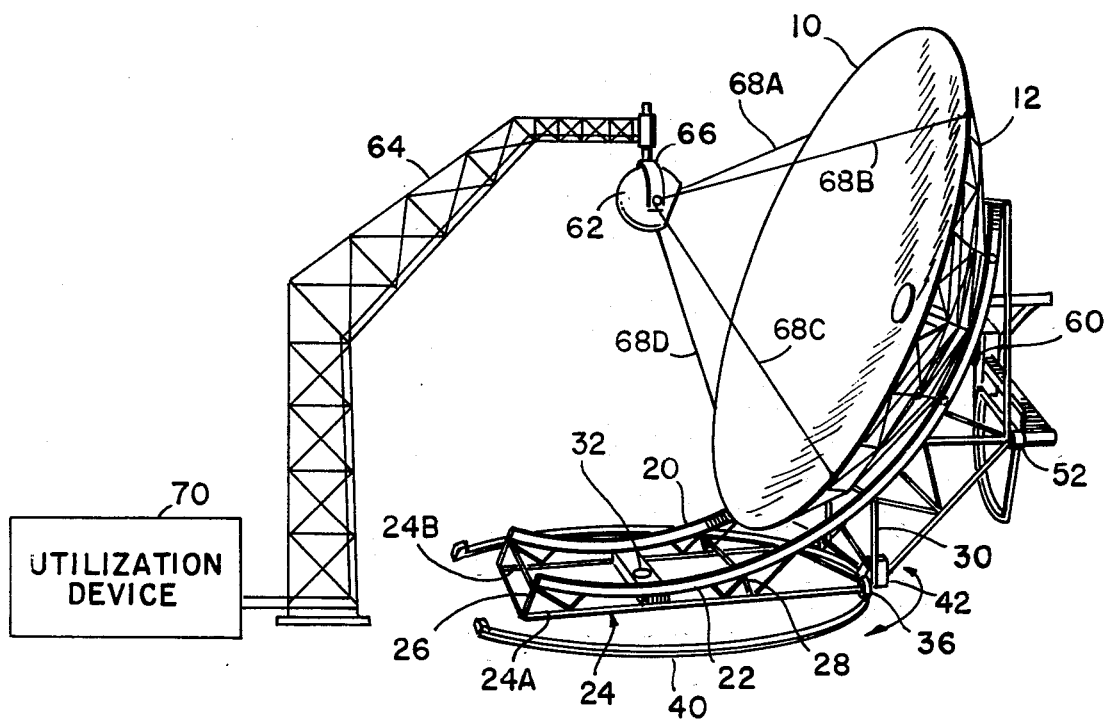
FIG. 1 is a view in perspective of an embodiment of the invention.
Figure 2:
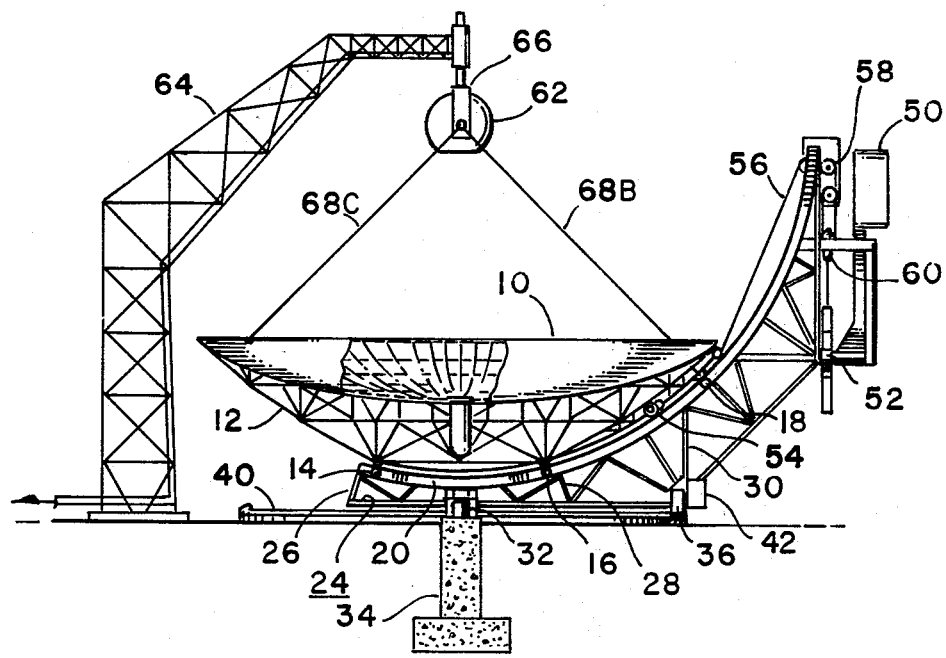
FIG. 2 is a view in elevation of an embodiment of the invention, with the parabola shown in section to provide a better view of the supporting structure.
Figure 3:
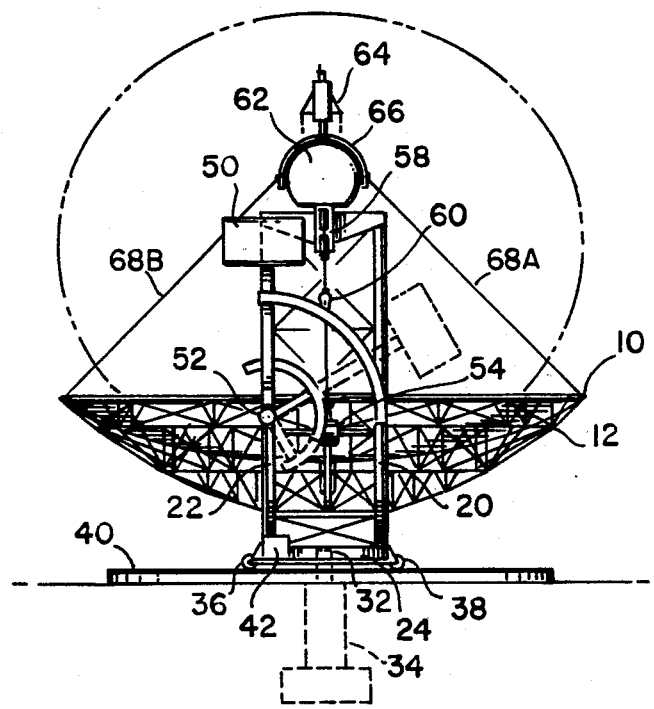
FIG. 3 is a rear view of the embodiment of the invention.

Considering now the respective FIGS. 1, 2, and 3 of the drawings, the embodiment of the invention comprises a a parabolic reflector 10 which has an open grid support structure 12. The support structure 12 rests upon three pairs of wheels, respectively 14, 16, and 18, only one of each pair being shown in FIG. 2. The three pairs of wheels are captured by two spaced, curved rails respectively 20, 22, which describe a curve which extends vertically and which has a length sufficient to enable the reflector to move from a horizontal to substantially a vertical position.

The curved rails and their immediate support structure constitute the elevation frame for the reflector. The curved rails are supported on the azimuthal frame 24, which comprises two spaced beams respectively 24a, 24b to which the curved rails are attached as by supports 26, 28, 30.

The azimuthal frame 24 is supported and restrained at the center by a pivot, 32. The pivot may be anchored in concrete, 34. At two other points, wheels 36, 38 support ends of the respective rails 24a, 24b of the azimuthal frame on a circular track 40.

From the foregoing it will be seen that the structural relationship between the reflector support structure and the azimuthal frame is a triangular (3 point) load transfer configuration. This kinematic relationship will prevent a deflection of either structure from imposing a strain on the other. This kinematic feature also permits large tolerances, on the order of ± one inch radial deviation to be used in the fabrication of the azimuthal frame curved rails. One of the azimuth wheels, 36, is driven by an azimuth actuator, 42, in order to provide the azimuth drive motion.

The parabolic structure is counterbalanced about its elevation axis by a pendulum cable system, including a pendulum 50, which rotates about a pivotal point 52. An azimuthal actuator motor 54, pulls on a cable 56, which rides over a fixed pulley system 58, and then extends to a moveable pulley system 60, which is then attached to the pendulum 50.

Both the elevation and azimuth actuators are coupled to their respective drive systems with effectively antiback lash linkages. This allows the use of standard commercial gear boxes for the makeup of the drive actuators.

The mirror surface of the parabolic reflector may be made by mounting second surface glass mirror segments to a series of monocoque panels that will cover the parabolic structure. The glass is attached to the panels by discrete fasteners in order to be free of strain that is caused by thermal expansion.

The construction of the system is such that the control axes, both azimuth and elevation, are arranged to intersect at the focal point of the parabola. As a result, the solar energy receiving means which comprises a heat engine 62, may be mounted independently of the parabolic reflector and its structure at the focal point of the parabolic reflector. It is mounted on a small tower 64. It may be mounted in a gimbal 66, and tethered to the parabola structure by a system of cables 68A, 68B, etc. This will keep the receiver pointed along the axis of the parabola. These cables may be equipped with spring damping systems, not shown, in order to minimize dynamic interaction between the separate structures that might be caused by wind induced vibration. The solar heat receiver, may comprise, for example, thermionic diodes, which generate electricity in response to the received heat. The electricity may be conducted down the tower to a utilization device 70.

It can be seen that the tracks 20, 22 extend along a circle with an axis which is horizontal (so that the tracks are curved in a vertical plane) and which also passes through the energy receiving means 62, and that the tracks are in turn mounted to rotate about a vertical axis which passes through the energy receiving means 22. The rollers 14, 16, 18, which are fixed in location relative to the mirror, maintain the mirror at a constant orientation with respect to the track portion on which the rollers rest, so that the axis of the mirror rotates as it moves along the curved track.

Figure 4:
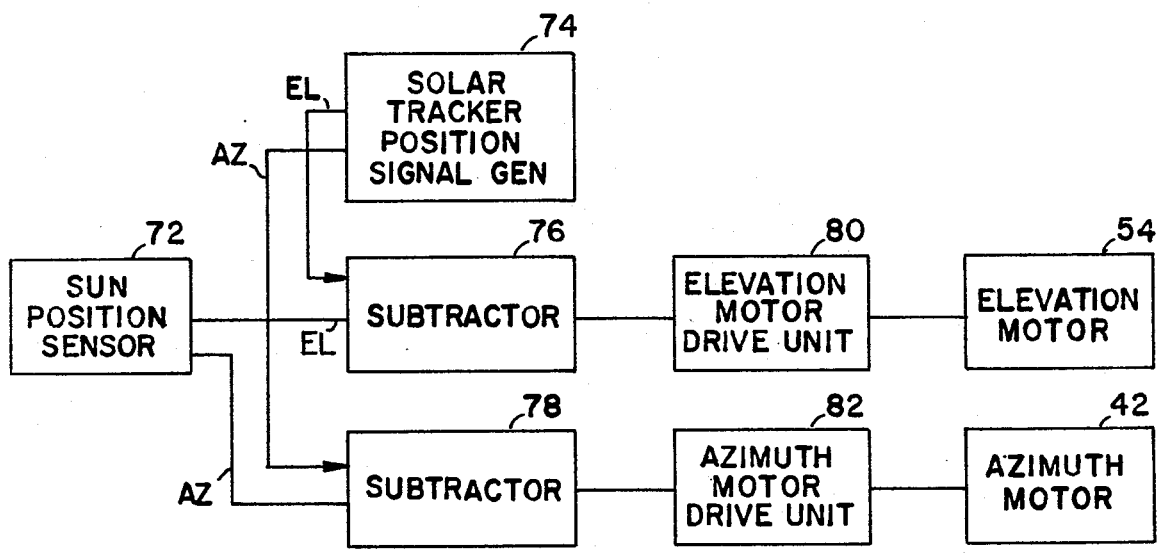
FIG. 4 is a block schematic diagram exemplifying circuits for a suitable sun tracking arrangement which may be employed to provide tracking signals to the embodiment of the invention.

FIG. 4 is a block schematic diagram of a system for generating the electrical signals required to maintain the parabolic reflector oriented in the direction of the sun. This is shown by way of illustration, and is not to be considered as a limitation upon the invention since systems of this sort have been used by such organizations as the National Aeronautics and Space Administration. A sun position sensor 72, produces as an output, signals respectively respresentative of elevation and azimuth of the sun. A solar tracking position signal generator 74 which may comprise two potentiometers, the respective moveable arms of which are positioned to represent the location of the parabolic reflector in elevation and azimuth produce two electrical signal outputs respectively representative of reflector elevation and azimuth. The respective elevation and azimuth representative signals are respectively subtracted in subtractors 76 and 78, whereby the subtractor 76 produces a difference signal at its output representing the difference between the sun's elevation and that of the parabolic reflector, and the subtractor 78 produces a difference signal at its output representing the difference in azimuth between the sun's position and the parabolic reflector. The respective difference signals are respectively applied to the elevation motor drive unit 80 and to an azimuth motor drive unit 82. The respective outputs of the elevation motor drive unit and azimuth motor drive unit are respectively applied to elevation motor 54 and azimuth motor 42, which operate to maintain the parabolic reflector tracking the sun in its path across the sky. The sun is tracked only for the purpose of energy collection, not navigation. This allows a larger tracking error, 0.1°, than is conventionally used for space navigation, with resultant economies throughout the design of the mechanism and control system.

The unique design configuration, transfers the load from the azimuth frame to the parabolic support structure at or near the optimal restrain points of its radial trusses where the effects of the load distribution moments are minimized. This reduces the steel usage in the parabolic reflector with regard to its required loading.

The large tolerances allowed for the fabrication of the curved rails on the azimuth frame by the kineomatic relationship between it and the parabolic reflector support structure minimizes construction costs. The sun tracking deviations ± 0.4°, occurring at 0.03° per hour, that might be caused by these tolerance-induced errors are accounted for by the control system with no increase in complexity or cost.

There has accordingly been described and shown hereinabove a novel and useful sun tracking solar energy collecting system. Cost estimates which have been made by breaking the assembly into its component parts, with each part being separately costed out and including tooling and process planning as well as the labor required indicates a proposed cost of $16.00 or less per square foot of reflector. A 60-foot reflector appears to produce a cost optimum.

It is claimed:

1. A sun tracking solar energy collector comprising:
   azimuth framework means,
   means supporting said azimuth framework means for horizontal rotation about a vertical axis,
   a pair of arcuate rails, means supporting said arcuate rails at one end extending vertically from said azimuth framework means,
   a parabolic reflector,
   wheel means supporting said parabolic reflector on said arcuate pair of rails,
   counter balance means for counter balancing the weight of said parabolic reflector,
   first motor means coupled to said counter balance means for causing said parabolic reflector to assume different desired elevations, and
   second motor means coupled to said means supporting said azimuth framework means for causing said azimuth framework means and therewith said parabolic reflector to assume predetermined azimuthal positions.

2. The apparatus as described in claim 1 wherein said parabolic reflector has focal point and there is included:
   energy converting means fixed in location, and wherein
   said rails are curved about a circle whose axis is horizontal and passes through said energy converting means, so that said reflector is shifted as it turns so that its focal point can remain on said energy converting means.

3. Apparatus as recited in claim 2 wherein there is included:
   gimbal means for supporting said energy converting means, and
   means for pivoting said energy converting means to always face said parabolic reflector.

4. A sun tracking energy collector comprising:
   a solar energy receiving means;
   a concave mirror for concentrating sunlight onto said receiving means;

a curved track;

an azimuth frame supporting said curved track;

means for supporting said azimuth frame in rotation about a substantially vertical axis;

said azimuth frame supporting said curved track so it is curved in a substantially vertical plane; and means for moveably supporting said mirror on said track to move therealong and maintain said mirror at a constant orientation with respect to the portion of track on which the mirror rests, so that the axis of the mirror rotates as it moves along the track which is curved in a vertical plane.

5. The apparatus described in claim 4 wherein:

said receiving means is fixed in location with respect to the ground;

said means for supporting said azimuth frame is positioned so that said vertical axis passes through said receiving means; and said track is curved about a horizontal axis which extends through said receiving means, and said means for moveably supporting said mirror on said track includes a plurality of elements mounted at fixed locations with respect to said mirror and moveable along said track.

6. A sun tracking energy collector, comprising:

a solar energy receiving means;

means for mounting said receiving means at a fixed location with respect to the ground;

a concave mirror for concentrating sunlight on said receiving means; and means for rotatably supporting said mirror in rotation about a vertical axis passing through said receiving means and in rotation about a horizontal axis passing through said receiving means.

7. The apparatus described in claim 6 wherein:

said means for rotatably supporting said mirror includes a track extending along a circle which has a horizontal axis passing substantially through said receiving means, and means for supporting said track in rotation about a vertical axis passing substantially through said receiving means.

8. The apparatus described in claim 6 wherein:

said receiving means is rotatably mounted so it can follow said mirror, and including cable means connecting said mirror and said receiving means, to turn said receiving means without forcing it to shift location.

* * * * *